(12) United States Patent
Jang et al.

(10) Patent No.: US 12,047,000 B2
(45) Date of Patent: Jul. 23, 2024

(54) DC-DC CONVERTER FOR SOLAR-LINKED SYSTEM

(71) Applicant: LG INNOTEK CO., LTD., Seoul (KR)

(72) Inventors: Ju Young Jang, Seoul (KR); Soo Hong Kim, Seoul (KR); Jae Geun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 606 days.

(21) Appl. No.: 17/266,394

(22) PCT Filed: Aug. 20, 2019

(86) PCT No.: PCT/KR2019/010592
§ 371 (c)(1),
(2) Date: Feb. 5, 2021

(87) PCT Pub. No.: WO2020/040532
PCT Pub. Date: Feb. 27, 2020

(65) Prior Publication Data
US 2021/0313888 A1    Oct. 7, 2021

(30) Foreign Application Priority Data
Aug. 22, 2018 (KR) .................. 10-2018-0098180

(51) Int. Cl.
*H02M 3/158* (2006.01)
*H02J 3/38* (2006.01)
(Continued)

(52) U.S. Cl.
CPC ............. *H02M 3/158* (2013.01); *H02J 3/381* (2013.01); *H02J 7/35* (2013.01); *H02J 2207/20* (2020.01);
(Continued)

(58) Field of Classification Search
CPC ........ H02M 3/158; H02M 1/36; H02M 3/156; H02M 7/48; H02M 1/32; H02J 3/381;
(Continued)

(56) References Cited

U.S. PATENT DOCUMENTS

| 2012/0032605 A1* | 2/2012 | Peng | H05B 45/14 |
| | | | 315/219 |
| 2013/0106328 A1 | 5/2013 | Kopiness et al. | |

(Continued)

FOREIGN PATENT DOCUMENTS

| CN | 102799557 A | 11/2012 |
| CN | 104272571 A | 1/2015 |

(Continued)

OTHER PUBLICATIONS

Ying et al., "Research on Pre-charging Control Strategy of Inverter System", Electric Drive, vol. 44, No. 11, 2014, pp. 21-25.
(Continued)

*Primary Examiner* — Paul Dinh
(74) *Attorney, Agent, or Firm* — Birch, Stewart, Kolasch & Birch, LLP (57) ABSTRACT

According to an embodiment, disclosed is a DC-DC converter in a solar-linked system, the DC-DC converter including: an initial charging circuit which connects an inverter with a first node and is used for charging an inverter-side capacitor; an intermediate capacitor; and a switching circuit connected in parallel to the intermediate capacitor and composed of a first switch and a second switch that are connected in series, wherein the initial charging circuit applies a voltage to a first node according to a received control signal, and performs charging of a battery.

12 Claims, 4 Drawing Sheets

(51) Int. Cl.
   *H02J 7/35* (2006.01)
   *H02S 40/32* (2014.01)
   *H02S 40/38* (2014.01)

(52) U.S. Cl.
   CPC .......... *H02J 2300/26* (2020.01); *H02S 40/32* (2014.12); *H02S 40/38* (2014.12)

(58) Field of Classification Search
   CPC ...... H02J 7/35; H02J 2207/20; H02J 2300/26; H02J 3/32; H02J 2300/24; H02S 40/32; H02S 40/38; H02H 7/1222; Y02E 70/30; Y02P 90/50
   USPC .......................................................... 320/140
   See application file for complete search history.

(56) References Cited

U.S. PATENT DOCUMENTS

| | | | |
|---|---|---|---|
| 2013/0154391 A1 | 6/2013 | Urciuoli | |
| 2013/0308356 A1 | 11/2013 | Subramanium et al. | |
| 2014/0002040 A1* | 1/2014 | Ting | G05F 1/561 323/273 |
| 2018/0097390 A1 | 4/2018 | Kube | |
| 2018/0361865 A1* | 12/2018 | Bando | B60L 53/30 |
| 2019/0029099 A1* | 1/2019 | Mao | H05B 45/50 |

FOREIGN PATENT DOCUMENTS

| | | |
|---|---|---|
| CN | 105281643 A | 1/2016 |
| CN | 106374552 A | 2/2017 |
| CN | 108123427 A | 6/2018 |
| CN | 108233496 A | 6/2018 |
| DE | 11 2016 005 269 T5 | 8/2018 |
| EP | 2 523 333 A1 | 11/2012 |
| EP | 2 587 656 A1 | 5/2013 |
| JP | 7-5937 A | 1/1995 |
| JP | 8-126339 A | 5/1996 |
| JP | 2003-52170 A | 2/2003 |
| JP | 2005-73399 A | 3/2005 |
| JP | 2009-247093 A | 10/2009 |
| JP | 2015-15785 A | 1/2015 |
| JP | 2015-156795 A | 8/2015 |
| JP | 2016-152634 A | 8/2016 |
| JP | 2016-174473 A | 9/2016 |
| JP | 2017-17839 A | 1/2017 |
| JP | 2017-130293 A | 7/2017 |
| JP | 2017-184333 A | 10/2017 |
| JP | 2017-208979 A | 11/2017 |
| KR | 10-2017-0013671 A | 2/2017 |

OTHER PUBLICATIONS

Chen, "A Variable Voltage Converter with Direct Bypass for Traction Drive Inverters," IEEE Energy Conversion Congress and Exposition, 2013, pp. 2793-2798.

* cited by examiner

DC-DC CONVERTER FOR SOLAR-LINKED SYSTEM

CROSS REFERENCE TO RELATED APPLICATIONS

This application is the National Phase of PCT International Application No. PCT/KR2019/010592, filed on Aug. 20, 2019, which claims priority under 35 U.S.C. 119(a) to Patent Application No, 10-2018-0098180, filed in the Republic of Korea on Aug. 22, 2018, all of which are hereby expressly incorporated by reference into the present application.

TECHNICAL FIELD

In the present disclosure, in a solar-linked system, a DC-DC converter including a circuit for blocking current according to a control signal is disclosed.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of photovoltaic modules is converted to AC power through an inverter, and thus, it can be immediately used in industrial facilities.

Meanwhile, in the case of solar power generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, there are many cases where a means for controlling the connection between the battery-side and the inverter-side is required when actually working or operating, and research related to this is being conducted.

DETAILED DESCRIPTION OF THE INVENTION

Technical Subject

The present disclosure may disclose a DC-DC converter including a circuit for blocking current according to a control signal in a solar-linked system. Since the voltage on the battery-side is cut off at the inverter-side according to the control signal, the operator performing the installation and the like can easily work. In addition, when the voltage applied from the inverter-side is high, by blocking the current applied from the inverter according to the control signal the switch element in the DC-DC converter can be protected from the voltage applied from the inverter-side. The technical problem to be solved is not limited to the technical problems as described above, and various technical problems may be further included within a range that is obvious to a person skilled in the art.

Technical Solution

A DC-DC converter according to the first aspect comprises: an initial charging circuit that connects an inverter and a first node, and is used for charging a capacitor of the inverter-side; an intermediate capacitor connected between the first node and ground; and a switching circuit connected in parallel with the intermediate capacitor and composed of a first switch and a second switch connected in series, wherein the initial charging circuit applies a voltage to the first node according to a received control signal, so that the charging of the battery can be performed.

In addition, the battery may be charged based on a voltage applied to a second node to which the first switch and the second switch are connected.

In addition, the initial charging circuit may block a current flow according to a received control signal, so that a voltage applied to the inverter-side by the battery can be blocked.

In addition, the initial charging circuit may include: a first current control circuit composed of a third switch and a resistor connected in series; and a fourth switch connected in parallel with the first current control circuit.

In addition, the first current control circuit may perform rapid charging of the battery by supplying a current having a predetermined magnitude.

In addition, the initial charging circuit further includes a second current control circuit, and the initial charging circuit may perform rapid charging of the battery by supplying current through the first current control circuit or the second current control circuit depending on the magnitude of current that can be rapidly charged.

In addition, the resistor is a variable resistor, and the size of the variable resistor may be controlled according to the magnitude of a current capable of rapid charging.

In addition, the first switch, the second switch, the third switch, and the fourth switch may include a field-effect transistor (FET).

Further, the direction of the diodes of the third switch and the fourth switch may be a direction in which a current flowing from the first node to the inverter is blocked. In addition, the direction of the diode of the first switch may be a direction in which a current flowing from the first node to the second node is blocked.

In addition, the direction of the diode of the second switch may be a direction in which a current flowing from the second node to the ground is blocked.

In addition, the initial charging circuit, according to the passage of time, may apply a current in a state when the third switch is turned on at the first time point and the fourth switch is turned off, and apply current in a state when the third switch is turned on at the second time point and the fourth switch is turned on, and apply a current in a state when the third switch is turned off at the third time point and the fourth switch is turned on.

A DC-DC converter according to the second aspect comprises: an initial charging circuit that connects the inverter and the first node, and is used for charging the capacitor of the inverter-side; and a switching circuit comprising a first switch and a second switch connected in series, and connected between the first node and a ground, wherein when a connection request signal is applied to the initial charging circuit, the initial charging circuit electrically connects the inverter-side and the first node, and wherein when a blocking request signal is applied to the initial charging circuit, the initial charging circuit electrically cuts off the inverter-side and the first node, and the voltage applied to the inverter-side can be blocked by a battery.

In addition, the initial charging circuit may include: a first current control circuit composed of a third switch and a resistor connected in series; and a fourth switch connected in parallel with the first current control circuit.

Advantageous Effects

The DC-DC converter disclosed in the present disclosure may include a circuit that blocks current according to a control signal. Accordingly, since the voltage on the battery-side is cut off at the inverter-side according to the control signal, the operator performing the installation or the like can easily work. In addition, when the voltage applied from the inverter-side is high, the current applied from the inverter is blocked according to the control signal, so that the switching elements in the DC-DC converter can be protected from the voltage applied from the inverter-side.

BEST MODE

Hereinafter, embodiments of the present invention will be described in detail with reference to the accompanying drawings. However, the technical idea of the present invention is not limited to some embodiments to be described, but may be implemented in various forms, and if it is within the scope of the technical idea of the present invention, one or more of the components may be selected, combined, and substituted between the embodiments for use. In addition, terms (including technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology. In addition, terms used in the embodiments of the present invention are for describing the embodiments and are not intended to limit the present invention. In the present specification, the singular form may include the plural form unless specifically stated in the phrase, and when described as "at least one (or more than one) of A and B and C", it may contain one or more of all combinations that can be combined with A, B, and C. In addition, terms such as first, second, A, B, (a), (b), and the like may be used in describing the components of the embodiment of the present invention. These terms are only for distinguishing the component from other components, and are not limited to the nature, order, or order of the component by the term. And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components. In addition, when it is described as being formed or disposed in the "top (upper side) or bottom (lower side)" of each component, the top (upper side) or bottom (lower side) not only includes a case when the two components are in direct contact with each other but also includes a case where one or more other components are formed or disposed between the two components. In addition, when expressed as "top (upper side) or bottom (lower side)", the meaning of not only an upward direction but also a downward direction based on one component may be included.

Hereinafter, embodiments of the present invention will be described in detail with reference to the drawings.

Figure 1:
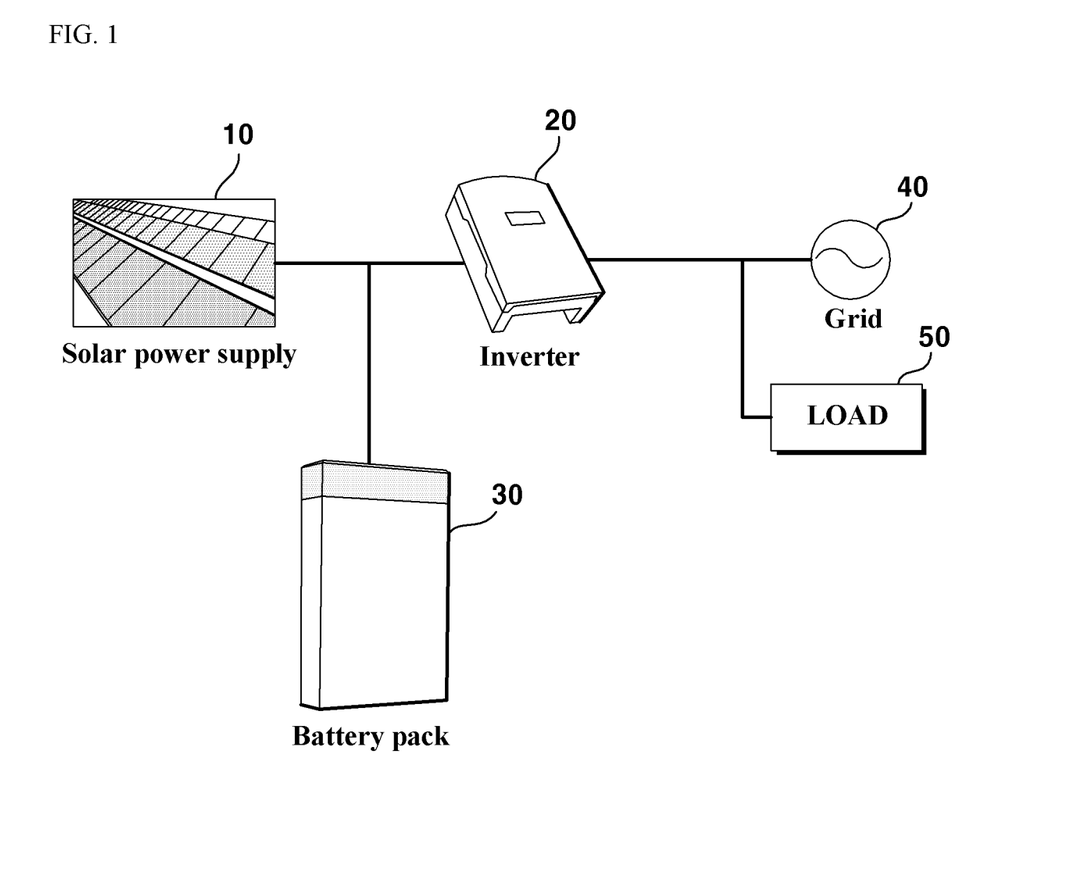
FIG. 1 is a diagram illustrating a solar power generation system according to an embodiment. The solar-linked energy storage system may be an example of a solar power generation system.

FIG. 1 is a diagram illustrating a solar power generation system according to an embodiment. The solar-linked energy storage system may be an example of a solar power generation system.

As illustrated in FIG. 1, a solar power generation system may comprise a solar power supply 10, an inverter 20, a battery pack 30, and a load 50.

However, it can be understood by a person skilled in the art that general-purpose components other than the components illustrated in FIG. 1 may be further included in the solar power generation system. For example, the solar power generation system may further include a power grid (GRID) 40. Or, according to another embodiment, it may be understood by a person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the power grid 40 or the load 50, the inverter 20 according to an embodiment may convert a direct current (DC) power generated by the solar power supply 10 by the photoelectric effect to an alternating current (AC) power. Here, the power grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the inverter 20 controls the voltage generated from the solar power supply 10 to find the maximum power and supply it to the power grid 40. At this time, when a case occurs in that the power for operating the inverter is lower than the output power of the inverter, the inverter 20 may consume the power of the power grid 40 in reverse. Of course, in this case, the inverter may prevent power from being reversed by blocking the power flowing into the power grid 40. Accordingly, various optimal control methods for extracting maximum power from the solar power supply 10 are applied to the solar power generation system, so that the above-described operation of the inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10, so that the rate of change of the power with respect to the change of the operating point of the terminal voltage of the array becomes '0'. The CV control method is a method of controlling the solar power supply 10 with a constant reference voltage regardless of the operating voltage or power of the array. According to each optimal control method, a power source input from the solar power supply 10 to the inverter may operate as a voltage source or a current source.

The load 50 according to an embodiment may refer to a product using an electricity type used in real life. For example, the inverter 20 may obtain AC power of a desired voltage and frequency through an appropriate conversion method, a switching element, or a control circuit, and supply electricity to home appliances in general homes or machinery products in industrial facilities.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the inverter 20 and the battery pack 30 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the inverter 20 and the battery pack 30 may communicate with each other through wired communication or wireless communication. For example, the inverter 20 and the battery pack 30 may comprise a Wi-Fi chip, a Bluetooth chip, a wireless communication chip, an NFC chip, or the like. Of course, the inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, ZigBee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Figure 2:
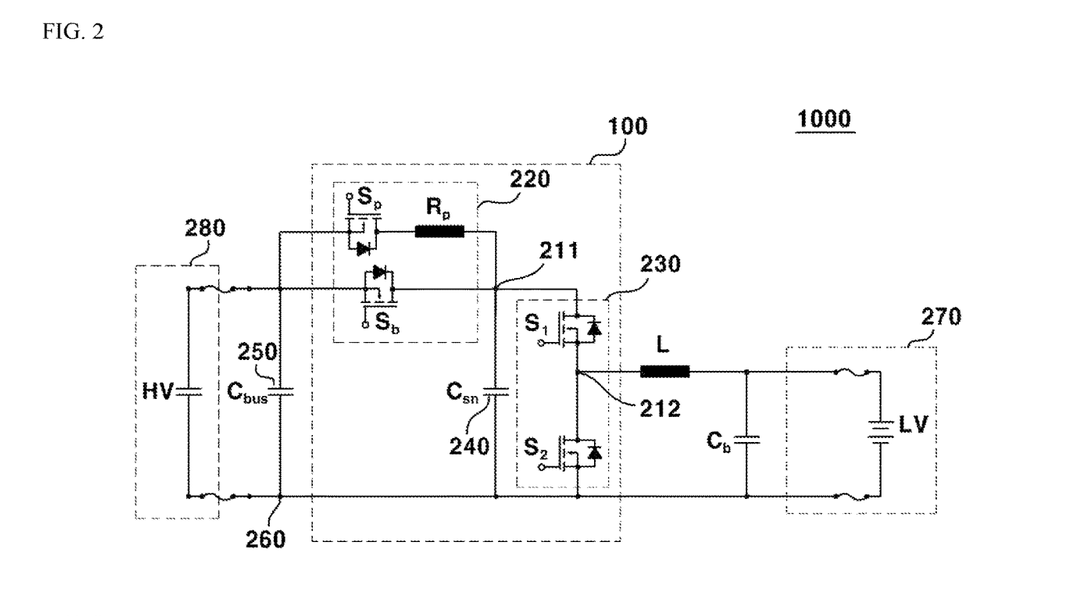
FIG. 2 is a block diagram illustrating in detail an example in which a DC-DC converter according to an embodiment is used in a solar-linked system.

FIG. 2 is a block diagram illustrating in detail an example in which a DC-DC converter 100 according to an embodiment is used in a solar-linked system 1000.

Referring to FIG. 2, a solar-linked system 1000 according to an embodiment may comprise an inverter-side 280, a DC-DC converter 100, and a battery-side 270. In addition, the DC-DC converter 100 may include an initial charging circuit 220, a switching circuit 230 and an intermediate capacitor 240. In addition, the switching circuit 230 may include a first switch $S_1$ and a second switch $S_2$, and the initial charging circuit 220 may include a first current control circuit including a third switch $S_p$ and a resistor $R_p$, and a fourth switch $S_b$.

A person skilled in the art can understand that other general-purpose components other than the components illustrated in FIG. 2 may be further included in the solar-linked system 1000 or the DC-DC converter 100. Or, according to another embodiment, it may be understood by a person skilled in the art that some of the components illustrated in FIG. 2 may be omitted.

As illustrated in FIG. 2, a solar-linked system 1000 may be configured in a half-bridge form. When the solar-linked system 1000 is configured in a half-bridge type, the voltage applied from the battery-side 270 can be directly transmitted to the inverter-side 280. Accordingly, the initial charging circuit 220 may block the current passing through the initial charging circuit 220 according to the control signal. When the initial charging circuit 220 is cut off, since the voltage applied from the battery-side 270 can be prevented from being transmitted to the inverter-side 280, the operator's convenience during installation can be promoted. Especially, when the DC-DC converter 100 is manufactured as a battery integrated type, when a half bridge circuit is configured, the voltage of the battery is applied to the inverter-side 280, since the initial charging circuit 220 is located in the middle, it is possible to prevent the voltage of the battery from being applied to the inverter-side 280, and the operator can easily work since the voltage is not induced in the inverter-side 280.

The initial charging circuit 220 blocks a current flow according to a received control signal, so that a voltage applied to the inverter-side 280 by the battery can be blocked.

The initial charging circuit 220 may connect or disconnect the right and left sides of the initial charging circuit 220 according to a control signal. For example, the initial charging circuit 220 is initially cut off and electrically separates the right and left sides of the initial charging circuit 220, but when the installation is completed, the right side and the left side of the initial charging circuit 220 can be connected.

The initial charging circuit 220 may receive a control signal through communication, and the control signal may include a connection request signal and a blocking request signal. Specifically, when a connection request signal is applied to the initial charging circuit 220, the initial charging circuit 220 may electrically connect the inverter-side 280 and a first node 211. When the inverter-side 280 and the first node 211 are electrically connected, charging of the battery can be performed based on the voltage applied to a second node 212 to which the first switch $S_1$ and the second switch $S_2$ are connected. As another example, when the initial charging circuit 220 is applied with a blocking request signal, the initial charging circuit 220 cuts off the inverter-side 280 and the first node 211, so that the voltage applied to the inverter-side 280 by the battery can be cut off.

The initial charging circuit 220 may include: a first current control circuit including a third switch $S_p$ and a resistor $R_p$; and a fourth switch $S_b$, wherein the first current control circuit and the fourth switch $S_b$ may be connected in parallel.

The initial charging circuit 220 may perform an initial charging function. For example, the initial charging circuit 220 may charge the inverter-side capacitor 250 by using power source applied from the battery-side 270. In this case, the initial charging circuit 220, according to the passage of time, may apply a current to the capacitor 250 of the inverter-side in a state when the third switch $S_p$ is turned on at the first time point and the fourth switch $S_b$ is turned off, and apply current to the capacitor 250 of the inverter-side in a state when the third switch $S_p$ is turned on at the second time point and the fourth switch $S_b$ is turned on, and apply a current to the capacitor 250 of the inverter-side in a state when the third switch $S_p$ is turned off at the third time point and the fourth switch $S_b$ is turned on.

The initial charging circuit 220 applies a voltage applied from the inverter-side 280 to the first node 211 according to a received control signal (e.g., a connection request signal), so that the charging of the battery can be performed by applying a voltage to the battery-side 270.

The initial charging circuit 220 may perform rapid charging of the battery. For example, the initial charging circuit 220 may turn on the fourth switch $S_b$ to apply a voltage applied from the inverter-side 280 to the first node 211. However, when the voltage applied from the inverter-side 280 is directly connected to the first node 211, and if there is a risk of overcurrent flowing, the initial charging circuit 220 may perform rapid charging of the battery by supplying a current of a predetermined magnitude through the first current control circuit. Since the first current control circuit contains the resistor $R_p$, when the fourth switch $S_b$ is turned off and the third switch $S_p$ is turned on, the voltage applied to the inverter-side 280 may not be directly applied to the first node 211.

The resistor $R_p$ may be a variable resistor. In this case, the size of the variable resistor can be controlled according to the magnitude of the current capable of rapid charging. For example, when the initial charging circuit 220 has a maximum current capable of rapid charging of 1 mA, the amount of current applied through the initial charging circuit 220 can be maintained to be less than 1 mA by controlling the size of the resistor $R_p$.

The intermediate capacitor 240 may be located between the first node 211 and the ground 260, and the switching circuit 230 may be connected to the intermediate capacitor 240 in parallel. The capacity of the inverter-side capacitor 250 may be greater than that of the intermediate capacitor 240.

The switching circuit 230 may include a first switch $S_1$ and a second switch $S_2$ connected in series. The battery may be charged based on a voltage applied to the second node 212 to which the first switch $S_1$ and the second switch $S_2$ are connected.

A switch included in the DC-DC converter 100 may be a field-effect transistor (FET). Specifically, the first switch $S_1$, the second switch $S_2$, the third switch $S_p$, and the fourth switch $S_b$ may be implemented with FETs.

When the first switch $S_1$, the second switch $S_2$, the third switch $S_p$, and the fourth switch $S_b$ are implemented with FETs, diodes included in each switch may be disposed in a predetermined direction. For example, the diode direction of the third switch $S_p$ and the fourth switch $S_b$ may be a direction in which a current flowing from the first node 211 to the inverter-side 280 is blocked. As another example, the diode direction of the first switch $S_1$ may be a direction that blocks a current flowing from the first node 211 to the second node 212. As another example, the diode direction of the second switch $S_2$ may be a direction in which a current flowing from the second node 212 to the ground 260 is blocked.

Since the initial charging circuit 220 is included in the DC-DC converter 100, according to the control signal, the voltage of the battery-side 270 is cut off at the inverter-side 280, so that workers who install and the like can work easily. In addition, when the voltage applied from the inverter-side 280 is high, the initial charging circuit 220 blocks the current applied from the inverter-side 280 according to the control signal, so that switches (e.g., the first switch $S_1$ and the second switch $S_2$) in the DC-DC converter 100 can be protected from a voltage applied from the inverter-side 280.

Figure 3:
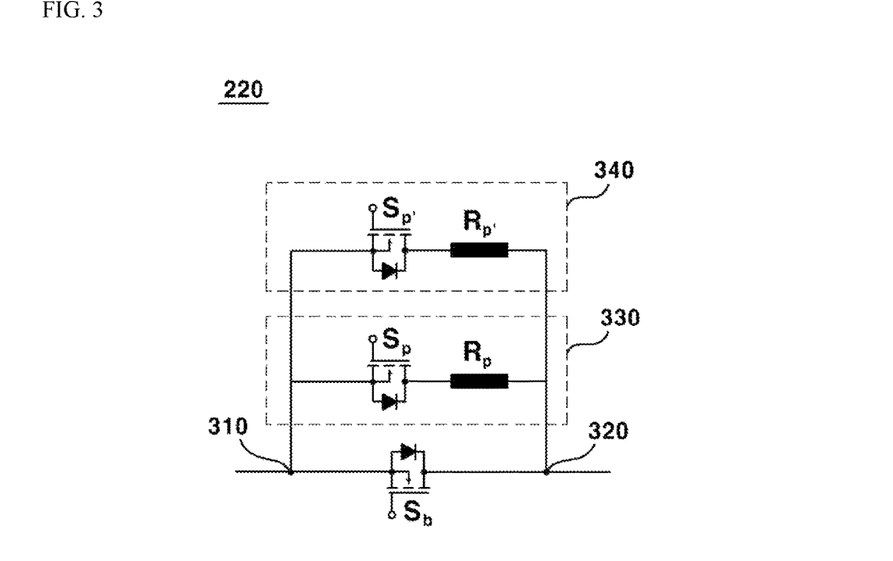
FIG. 3 is a diagram illustrating an example of an initial charging circuit including a first current control circuit and a second current control circuit according to an embodiment.

FIG. 3 is a diagram illustrating an example of an initial charging circuit 220 including a first current control circuit 330 and a second current control circuit 340 according to an embodiment.

The initial charging circuit 220 according to an embodiment may include a first current control circuit 330 and a second current control circuit 340. The first current control circuit may include a third switch $S_p$ and a resistor $R_p$, and the second current control circuit may include a fifth switch $S_p'$ and a resistor $R_p'$.

The initial charging circuit 220 can perform rapid charging for the battery by supplying current through the first current control circuit 330 and/or the second current control circuit 340 according to the magnitude of the current capable of rapid charging.

The resistor $R_p$ included in the first current control circuit 330 and the resistor $R_p'$ included in the second current control circuit 340 may have different sizes. The initial charging circuit 220 may apply a voltage to the first node through at least one of the first current control circuit 330 and the second current control circuit 340, so that the magnitude of the current applied to the initial charging circuit 220 will not exceed the maximum magnitude of the current capable of rapid charging.

For example, the initial charging circuit 220 may supply a current of the first magnitude by turning on the third switch $S_p$ and turning off the fifth switch $S_p'$, or may supply a current of the second magnitude By turning off the third switch $S_p$ and turning on the fifth switch $S_p'$, or may supply a current of the third magnitude By turning on the third switch $S_p$ and turning on the fifth switch $S_p'$. The third magnitude may be larger than the first magnitude and the second magnitude.

Figure 4:
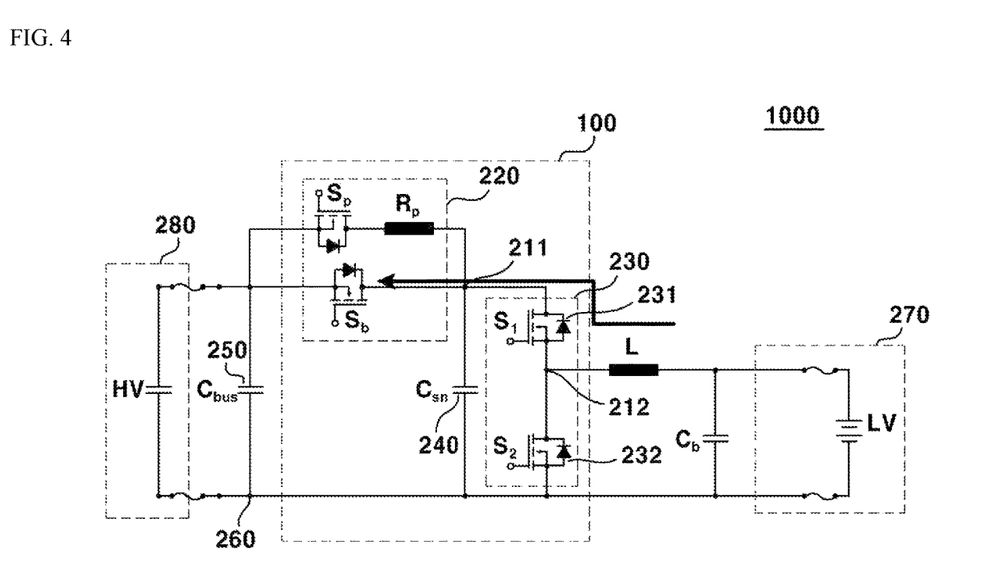
FIG. 4 is a diagram illustrating an example of an operation of a DC-DC converter when the voltage of the battery-side is higher than the voltage of the inverter-side, according to an embodiment.

FIG. 4 is a diagram illustrating an example of an operation of a DC-DC converter 100 when the voltage of the battery-side 270 is higher than the voltage of the inverter-side 280, according to an embodiment.

When the voltage of the battery-side 270 is higher than the voltage of the inverter-side 280, a limited current may flow through the resistor $R_p$ by turning on the third switch $S_p$. When sufficient current is applied from the battery-side 270 to the inverter-side 280 and the inverter-side capacitor 250 is charged by the voltage applied from the battery-side 270, the third switch $S_p$ is turned off and the fourth switch $S_b$ is turned on, so that the solar-linked system 1000 can be operated.

When the operation of the solar-linked system 1000 is stopped, the first switch $S_1$, the second switch $S_2$, the third switch $S_p$, and the fourth switch $S_b$ may be turned off. When the operation of the solar-linked system 1000 is stopped, the fourth switch $S_b$ may be firstly turned off and the third switch $S_p$ may be secondarily turned off, but the third switch $S_p$ and the fourth switch $S_b$ may be turned off almost simultaneously. For example, after the overall output of the solar-linked system 1000 is reduced to less than a predetermined value, the third switch $S_p$ and the fourth switch $S_b$ may be turned off almost simultaneously. As another example, the initial charging circuit 220 first turns off the fourth switch $S_b$ and secondarily turns off the third switch $S_p$, so that spark generated by the current flowing through the initial charging circuit 220 may be reduced.

Figure 5:
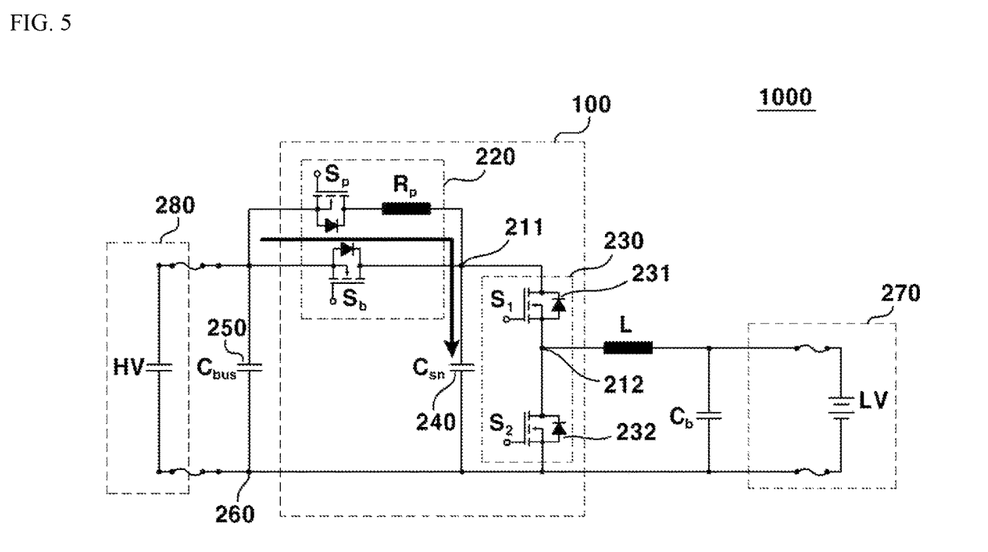
FIG. 5 is a diagram illustrating an example of an operation of a DC-DC converter when the voltage of the battery-side is lower than the voltage of the inverter-side, according to an embodiment.

FIG. 5 is a diagram illustrating an example of an operation of a DC-DC converter when the voltage of the battery-side 270 is lower than the voltage of the inverter-side 280, according to an embodiment.

When the voltage of the battery-side 270 is lower than the voltage of the inverter-side 280, the first switch $S_1$ and the second switch $S_2$, as a semiconductor breaker, may block current flowing to the battery-side 270.

When the voltage of the battery-side 270 is lower than the voltage of the inverter-side 280, the third switch $S_p$ is turned off and the fourth switch $S_b$ is turned on, so that the solar-linked system is system 1000 can be operated.

When the operation of the solar-linked system 1000 is stopped, the first switch $S_1$, the second switch $S_2$, the third switch $S_p$, and the fourth switch $S_b$ may be turned off. When the operation of the solar-linked system 1000 is stopped, the fourth switch $S_b$ may be firstly turned off and the third switch $S_p$ may be secondarily turned off, but the third switch $S_p$ and the fourth switch $S_b$ may be turned off almost simultaneously. For example, after the overall output of the solar-linked system 1000 is reduced to less than a predetermined value, the third switch $S_p$ and the fourth switch $S_b$ may be turned off almost simultaneously. As another example, the initial charging circuit 220 first turns off the fourth switch $S_b$ and secondarily turns off the third switch $S_p$, so that spark generated by the current flowing through the initial charging circuit 220 may be reduced.

Figure 6:
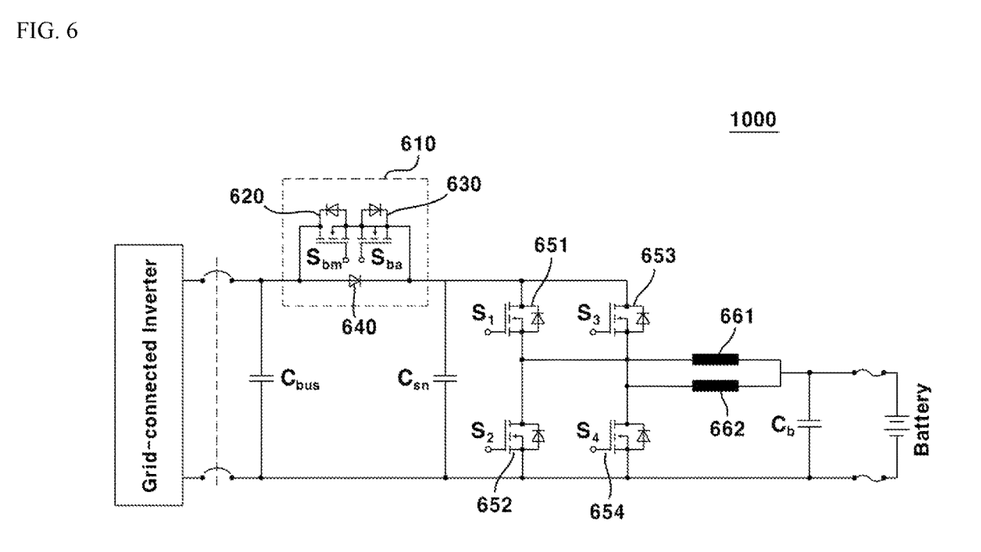
FIG. 6 is a diagram illustrating an example of a solar-linked system in which a diode is included in the initial charging circuit according to an embodiment.

FIG. 6 is a diagram illustrating an example of a solar-linked system 1000 in which a diode is included in the initial charging circuit 610 according to an embodiment.

Referring to FIG. 6, a fifth switch 620 and a sixth switch 630 are disposed in series in the initial charging circuit 610. In addition, the diode 640 is disposed in parallel with the fifth switch 620 and the sixth switch 630. Although the fifth switch 620 and the sixth switch 630 are disposed in series, the diodes included in the fifth switch 620 and the sixth switch 630 may be disposed facing opposite directions. Accordingly, the fifth switch 620 and the sixth switch 630 may block both current flowing from left to right and current flowing from right to left.

Further, although the diode 640 passes a current flowing from left to right, it can block a reverse current by blocking a current flowing from right to left.

A first switch 651 and a second switch 652 are connected in series, and a third switch 653 and a fourth switch 654 may be connected in series. In addition, the first switch 651 and the second switch 652 may be connected in parallel with the third switch 653 and the fourth switch 654. The solar-linked system 1000 can operate only with the third switch 653 and the fourth switch 654, but when the output is greater than or equal to a predetermined value, the first switch 651 and the second switch 652 may be added in parallel. When the first switch 651 and the second switch 652 are added in parallel, a first resistor 661 and a second resistor 662 may be connected to the battery-side. When the output is greater than or equal to a predetermined value, the circuit is configured in parallel, so that a larger output can be accommodated.

Specifications of the fifth switch 620 and the sixth switch 630 may be different. For example, the fifth switch 620 may have a specification of a low voltage, and the sixth switch 630 may have a specification of a high voltage. For example, the fifth switch 620 may have a voltage specification higher than the voltage VF of the diode 640. The VF voltage may refer to a forward voltage capable of turning on the diode 640. The fifth switch 620 allows the current to flow from left to right only through the diode 640, so that the sixth switch 630 is not turned on in a situation where the current must flow from left to right. The fifth switch 620 may exclude a possibility that reverse current may occur according to the characteristics of the sixth switch 630.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like).

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
an initial charging circuit for connecting an inverter and a first node, and being used for charging a capacitor of an inverter-side;
an intermediate capacitor connected to the initial charging circuit in series and connected between the first node and ground; and
a switching circuit connected in parallel with the intermediate capacitor and composed of a first switch and a second switch connected in series,
wherein the initial charging circuit applies a voltage to the first node according to a received control signal, so executes a charging of the battery.

2. The DC-DC converter according to claim 1, wherein the battery is charged based on a voltage applied to a second node to which the first switch and the second switch are connected.

3. The DC-DC converter according to claim 1, wherein the initial charging circuit cuts off a current flow according to a received control signal, so cuts off a voltage applied to the inverter-side by the battery.

4. The DC-DC converter according to claim 2, wherein the initial charging circuit includes:
a first current control circuit composed of a third switch and a resistor connected in series; and
a fourth switch connected in parallel with the first current control circuit.

5. The DC-DC converter according to claim 4, wherein the first current control circuit executes a rapid charging of the battery by supplying a current having a predetermined magnitude.

6. The DC-DC converter according to claim 5, wherein the initial charging circuit further includes a second current control circuit, and
wherein the initial charging circuit executes rapid charging of the battery by supplying current through the first current control circuit or the second current control circuit according to a magnitude of current that is capable of rapid charging.

7. The DC-DC converter according to claim 5, wherein the resistor is a variable resistor, and
wherein the size of the variable resistor is controlled according to a magnitude of current capable of rapid charging.

8. The DC-DC converter according to claim 4, wherein the first switch, the second switch, the third switch, and the fourth switch include a field-effect transistor (FET).

9. The DC-DC converter according to claim 8, wherein the third switch and the fourth switch each have a diode, and
wherein a direction of the diodes of the third switch and the fourth switch is a direction in which a current flowing from the first node to the inverter is cut off.

10. The DC-DC converter according to claim 8, wherein the first switch has a diode, and
wherein a direction of the diode of the first switch is a direction in which a current flowing from the first node to the second node is cut off.

11. The DC-DC converter according to claim 8, wherein the second switch has a diode, and
wherein the direction of the diode of the second switch is a direction in which a current flowing from the second node to the ground is cut off.

12. The DC-DC converter according to claim 4, wherein the initial charging circuit, according to a passage of time, applies a current in a state when the third switch is turned on at a first time point and the fourth switch is turned off, and applies current in a state when the third switch is turned on at a second time point and the fourth switch is turned on, and applies a current in a state when the third switch is turned off at a third time point and the fourth switch is turned on.

* * * * *